(12) United States Patent
Shinohara et al.

(10) Patent No.: US 12,196,386 B2
(45) Date of Patent: Jan. 14, 2025

(54) DISPLAY DEVICE

(71) Applicant: OMRON Corporation, Kyoto (JP)

(72) Inventors: Masayuki Shinohara, Nagaokakyo (JP); Norikazu Kitamura, Osaka (JP)

(73) Assignee: OMRON CORPORATION, Kyoto (JP)

(*) Notice: Subject to any disclaimer, the term of this patent is extended or adjusted under 35 U.S.C. 154(b) by 0 days.

(21) Appl. No.: 17/284,786

(22) PCT Filed: Sep. 17, 2019

(86) PCT No.: PCT/JP2019/036280
§ 371 (c)(1),
(2) Date: Apr. 13, 2021

(87) PCT Pub. No.: WO2020/090257
PCT Pub. Date: May 7, 2020

(65) Prior Publication Data
US 2021/0404626 A1    Dec. 30, 2021

(30) Foreign Application Priority Data

Oct. 31, 2018  (JP) ................... 2018-206135

(51) Int. Cl.
| | |
|---|---|
| F21V 8/00 | (2006.01) |
| F21S 43/241 | (2018.01) |
| F21S 43/245 | (2018.01) |

(52) U.S. Cl.
CPC ........... *F21S 43/245* (2018.01); *F21S 43/241* (2018.01); *G02B 6/0045* (2013.01)

(58) Field of Classification Search
CPC ...... F21S 43/245; F21S 43/241; G02B 6/0045
See application file for complete search history.

(56) References Cited

U.S. PATENT DOCUMENTS

| | | | |
|---|---|---|---|
| 5,555,160 A | 9/1996 | Tawara et al. | |
| 5,613,751 A | 3/1997 | Parker et al. | |
| 2001/0019380 A1* | 9/2001 | Ishihara | G02B 6/0018 349/65 |
| 2009/0073721 A1 | 3/2009 | Kamikatano et al. | |
| 2009/0201698 A1 | 8/2009 | Klick et al. | |

(Continued)

FOREIGN PATENT DOCUMENTS

| | | |
|---|---|---|
| CN | 107710054 A | 2/2018 |
| CN | 108072929 A | 5/2018 |

(Continued)

OTHER PUBLICATIONS

International Search Report of International Application No. PCT/JP2019/036280 issued on Nov. 12, 2019.

(Continued)

*Primary Examiner* — Fatima N Farokhrooz
(74) *Attorney, Agent, or Firm* — SHINJYU GLOBAL IP

(57) ABSTRACT

A light guide plate guides light from a light source to form an image in a space, and includes a light introduction portion and a light emitting portion. Light from the light source is incident on the light introduction portion. The light emitting portion includes a curved emission surface that emits light from the light source incident from the light introduction portion, and is bent and connected to the light introduction portion.

16 Claims, 9 Drawing Sheets

(56) References Cited

U.S. PATENT DOCUMENTS

| | | | |
|---|---|---|---|
| 2012/0081921 A1* | 4/2012 | Parker | G02B 6/0021 |
| | | | 362/609 |
| 2013/0314901 A1 | 11/2013 | Nirei | |
| 2014/0160779 A1* | 6/2014 | Pusch | F21S 43/239 |
| | | | 362/511 |
| 2014/0347885 A1* | 11/2014 | Wilcox | F21S 8/061 |
| | | | 362/612 |
| 2015/0092433 A1* | 4/2015 | Gloss | F21S 41/24 |
| | | | 362/511 |
| 2016/0195234 A1* | 7/2016 | Mateju | A61N 1/0468 |
| | | | 362/511 |
| 2017/0146721 A1 | 5/2017 | Fukui et al. | |
| 2017/0192237 A1* | 7/2017 | Dobschal | G02B 27/01 |
| 2017/0192244 A1 | 7/2017 | Shinohara et al. | |
| 2018/0003998 A1 | 1/2018 | Shinohara et al. | |
| 2018/0058656 A1* | 3/2018 | Naron | F21S 43/145 |
| 2018/0100979 A1 | 4/2018 | Osumi et al. | |
| 2018/0136386 A1 | 5/2018 | Takata et al. | |
| 2019/0243053 A1 | 8/2019 | Ono et al. | |
| 2021/0404625 A1* | 12/2021 | Shinohara | F21S 43/239 |

FOREIGN PATENT DOCUMENTS

| | | | | | |
|---|---|---|---|---|---|
| DE | 69608499 | T2 | | 1/2001 | |
| DE | 102005042523 | A1 | | 12/2006 | |
| EP | 2816276 | A2 | * | 12/2014 | B60Q 1/0035 |
| EP | 3210827 | A1 | * | 8/2017 | F21S 43/14 |
| JP | 2002-297071 | A | | 10/2002 | |
| JP | 2007221359 | | * | 8/2007 | F21S 43/245 |
| JP | 2011-27929 | A | | 2/2011 | |
| JP | 2011-129251 | A | | 6/2011 | |
| JP | 2011222233 | | * | 11/2011 | F21S 43/245 |
| JP | 2013-175483 | A | | 9/2013 | |
| JP | 2016017891 | | * | 2/2016 | |
| JP | 2016-114929 | A | | 6/2016 | |
| JP | 2016-157542 | A | | 9/2016 | |
| JP | 2016-218269 | A | | 12/2016 | |
| JP | 2018-75930 | A | | 5/2018 | |
| KR | 101509370 | B1 | * | 4/2015 | |
| WO | 2017/061114 | A1 | | 4/2017 | |
| WO | 2018/088023 | A1 | | 5/2018 | |
| WO | WO-2018149741 | A1 | * | 8/2018 | B60Q 3/51 |

OTHER PUBLICATIONS

Written Opinion of the International Searching Authority of International Application No. PCT/JP2019/036280 issued on Nov. 12, 2019.

The Office Action for the corresponding Chinese application No. 201980066275.6, issued on Jun. 1, 2022.

The Office Action for the corresponding German application No. 112019004403.6, issued on Nov. 11, 2022.

The Office Action for the corresponding Chinese application No. 201980066275.6, issued on Sep. 13, 2023.

* cited by examiner

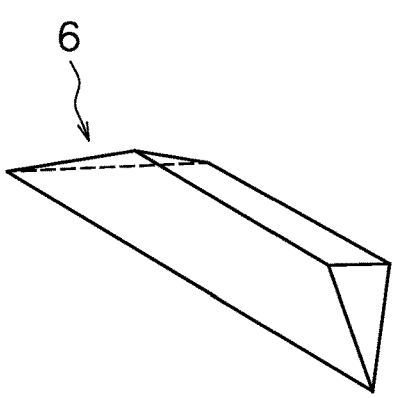
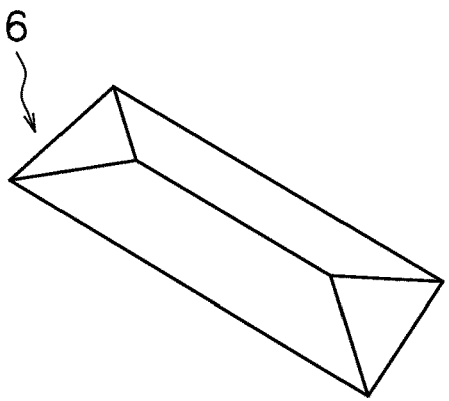
FIG. 7A          FIG. 7B
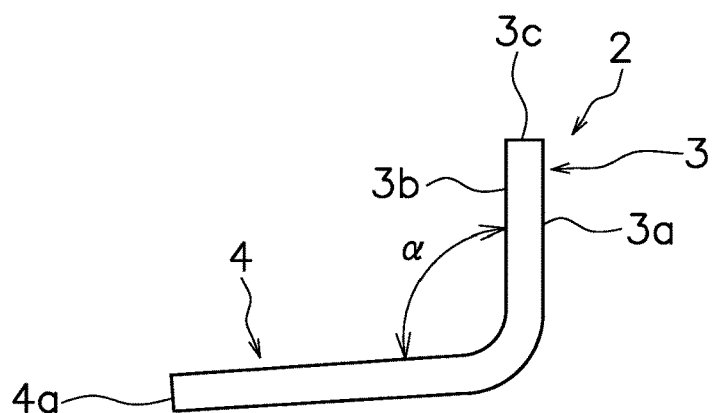
FIG. 8
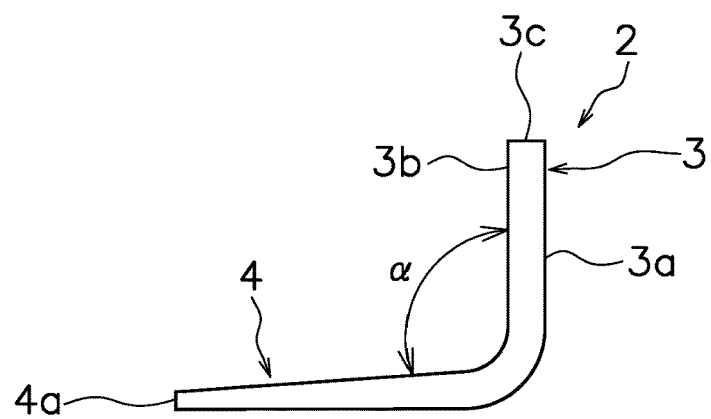
FIG. 9

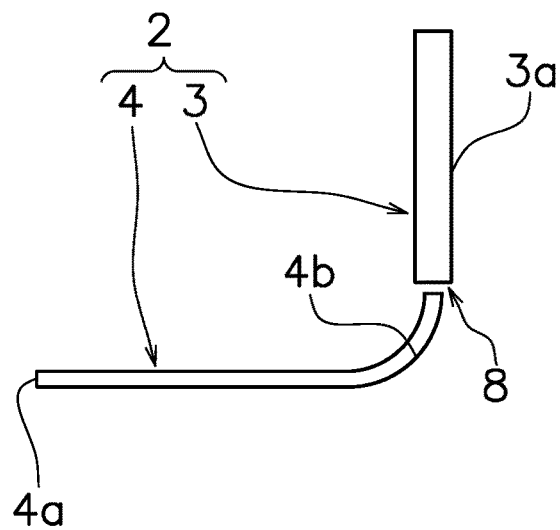
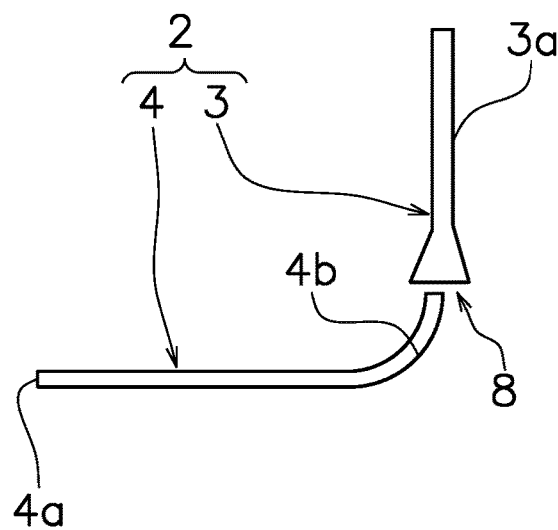
FIG. 13A     FIG. 13B
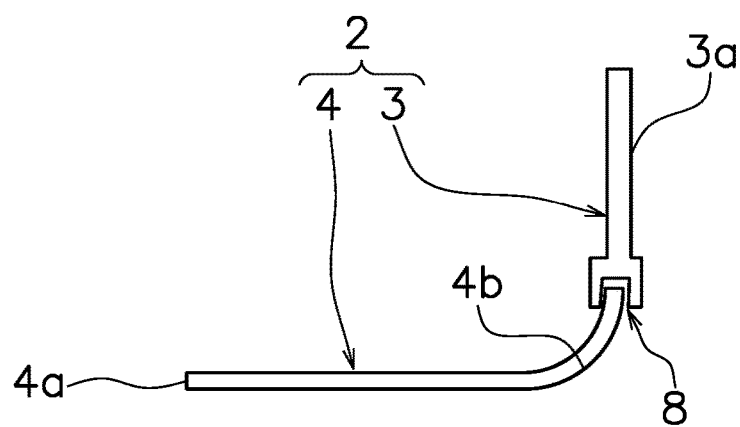
FIG. 13C

DISPLAY DEVICE

CROSS-REFERENCE TO RELATED APPLICATION

This application is the U.S. National Phase of International Application No. PCT/JP2019/036280, filed on Sep. 17, 2019. This application claims priority to Japanese Patent Application No. 2018-206135, filed Oct. 31, 2018. The contents of those applications are incorporated by reference herein in their entireties.

FIELD

The present invention relates to a light guide plate and a display device.

BACKGROUND

Conventionally, a display device that emits light from a light guide plate to form an image in a space is known (see, for example, Japanese Patent Application Laid-Open No. 2016-114929). The light guide plate includes a plurality of light guide portions, emits light from a light source from an emission surface via the plurality of light guide portions, and converges light at a fixed point in the air corresponding to each light guide portion. As a result, an image is formed in a space by a collection of light converged at a plurality of fixed points.

SUMMARY

In the light guide plate as described above, when an incident angle from the light source to the light guide plate is small, an image forming position is misaligned and it becomes difficult to form an image, thus the image tends to be blurred.

An object of the present invention is to provide a light guide plate to form an image which is less likely to be blurred.

A light guide plate according to one aspect of the present invention is a light guide plate which guides light from a light source to form an image in a space, and includes a light introduction portion and a light emitting portion. Light from the light source is incident on the light introduction portion. The light emitting portion includes a curved emission surface for emitting light from the light source which is incident from the light introduction portion, and is bent and connected to the light introduction portion.

In the light guide plate according to this aspect, since the curved emission surface is bent and connected to the light introduction portion, the incident angle from the light introduction portion to the light emitting portion nears 90 degrees as compared with a case where a flat light guide plate is used. Since this facilitates the design of the light guide plate, an image can be formed more easily, and as a result, the image is less likely to be blurred. Further, since the light emitting portion is bent and connected to the light introduction portion, it is possible to prevent a dead space from occurring in the light guide plate.

The light introduction portion may be formed integrally with the light emitting portion. In this case, the number of parts can be reduced, and the manufacturing process can be simplified since it is not necessary to connect the light introduction portion to the light emitting portion.

The light introduction portion may be formed separately from the light emitting portion. In this case, since shapes of the light emitting portion and the light introduction portion are simplified, the light guide plate can be easily manufactured.

The light emitting portion and the light introduction portion may be connected in an L shape. In this case, it is easy to design the light guide plate.

The light emitting portion may include a radiation portion formed on its end surface and capable of externally radiating light from the light source which is incident from the light introduction portion. In this case, the amount of light around the light emitting portion can be increased.

The light guide plate may further include a test pattern portion for evaluating emission characteristics of the light emitting portion. The test pattern portion may be provided on a part of the emission surface of the light emitting portion. In this case, it is possible to easily evaluate emission the characteristics of the light guide plate.

A display device according to another aspect of the present invention includes a light source and the light guide plate described above. In this case, the same effects as described above can be obtained in the display device.

BRIEF DESCRIPTION OF THE DRAWINGS

FIGS. 7A and 7B are views showing an example of another shape of a prism.
FIG. 8 is a view for explaining an incident angle of a light introduction portion with respect to the light guide plate.
FIG. 9 is a view for explaining an incident angle of the light introduction portion with respect to the light guide plate.
FIGS. 13A, 13B, and 13C are cross-sectional views schematically showing a modified example of a connection part between the light guide plate and the light introduction portion.

DETAILED DESCRIPTION

Figure 1:
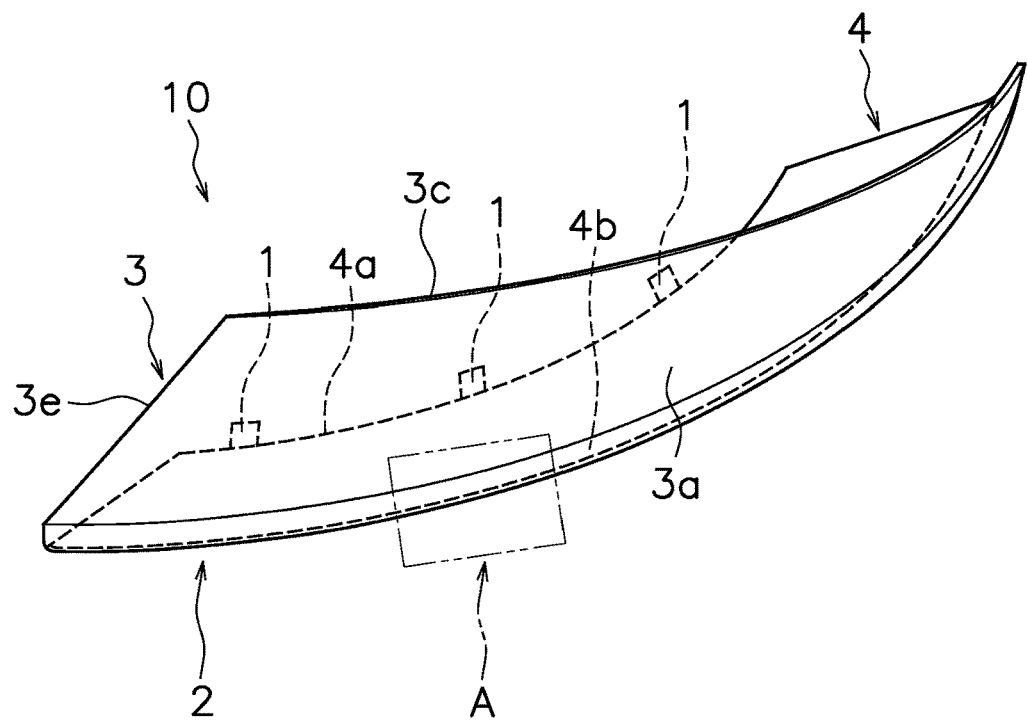
FIG. 1 is a perspective view of a display device.
Figure 2:
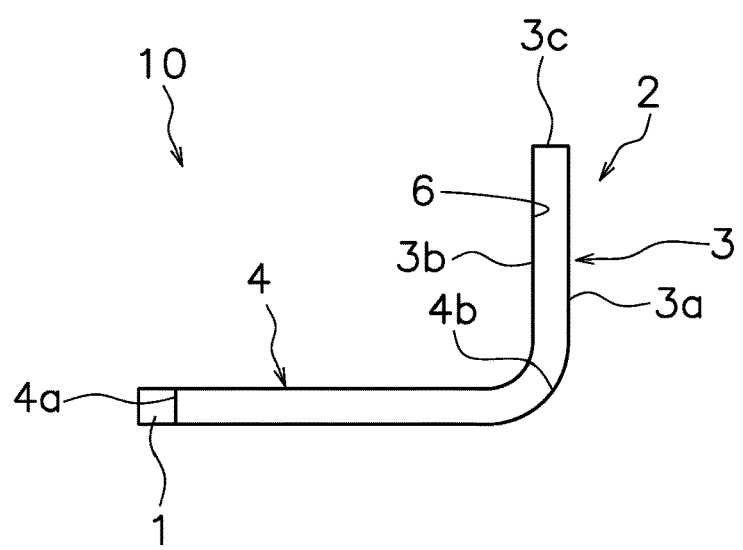
FIG. 2 is a cross-sectional view of the display device.
Figure 3:
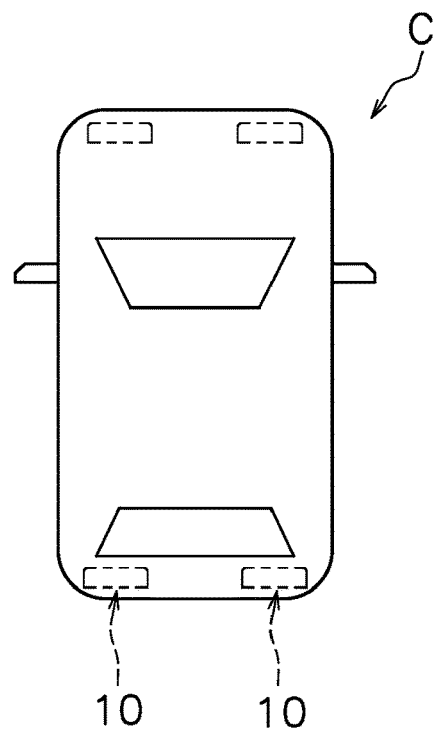
FIG. 3 is a schematic view of a vehicle viewed from above.

Hereinafter, a display device 10 according to an embodiment will be described with reference to the drawings. FIG. 1 is a perspective view of the display device 10. FIG. 2 is a cross-sectional view of the display device 10. As illustrated in FIG. 3, the display device 10 is used for tail lamps arranged on the rear left and right of a vehicle C, for example.

As illustrated in FIGS. 1 and 2, the display device 10 includes at least one or more light sources 1 and a light guide plate 2.

The light source 1 incidents light on the light guide plate 2. In the present embodiment, three light sources are disposed adjacent to the light guide plate 2 at intervals therebetween. The light source 1 is, for example, an LED (Light Emitting Diode). However, the light source 1 is not limited to the LED, and may be other light sources such as an OLED (Organic Light Emitting Diode) and an LD (Laser Diode).

Figure 4:
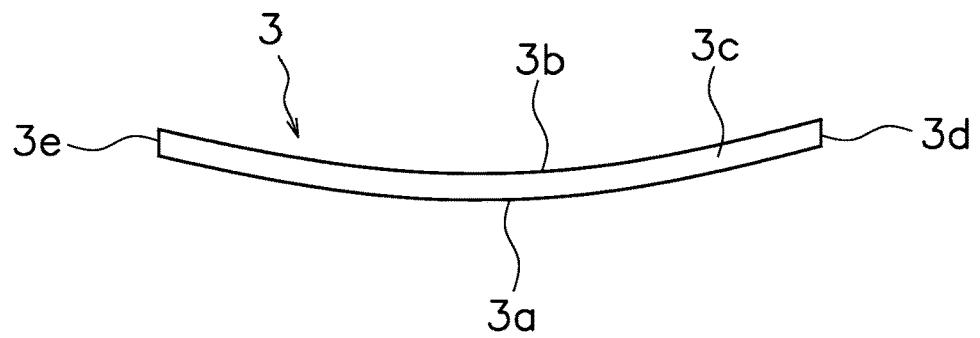
FIG. 4 is a view of a light guide plate viewed from above the vehicle.

FIG. 4 is a schematic view of the light guide plate 2 as viewed from above the vehicle C. As illustrated in FIGS. 1 and 4, the light guide plate 2 is formed in a curved shape. The light guide plate 2 guides light from the light source 1 to form a three-dimensional image A in a space. As a result, the light guide plate 2 projects the image A visually recognizable from outside of the vehicle C into a space without a screen. The light guide plate 2 is formed of a translucent material. The light guide plate 2 is formed of a transparent resin such as polymethylmethacrylate (PMMA), polycarbonate, or a cycloolefin polymer, or a material such as glass.

The light guide plate 2 includes a light emitting portion 3 and a light introduction portion 4. The light emitting portion 3 includes an emission surface 3a, a back surface 3b, and end surfaces 3c-3e. The emission surface 3a is formed to curve, and emits light from the light source 1 which is incident from the light introduction portion 4. The back surface 3b is located on the opposite side of the emission surface 3a. In the present embodiment, the light emitting portion 3 is curved so as to recess from a back surface 3b side toward an emission surface 3a side. The emission surface 3a is disposed on the rear side of the vehicle C. Radial dimension of the emission surface 3a of the light emitting portion 3 is preferably 180 mm or more. As a result, even if the image A is distorted, the distortion of the image A is less likely to be recognized when the image A is viewed. Further, the emission surface 3a of the light emitting portion 3 may be configured by combining curved surfaces having different radial dimensions.

Figure 5:
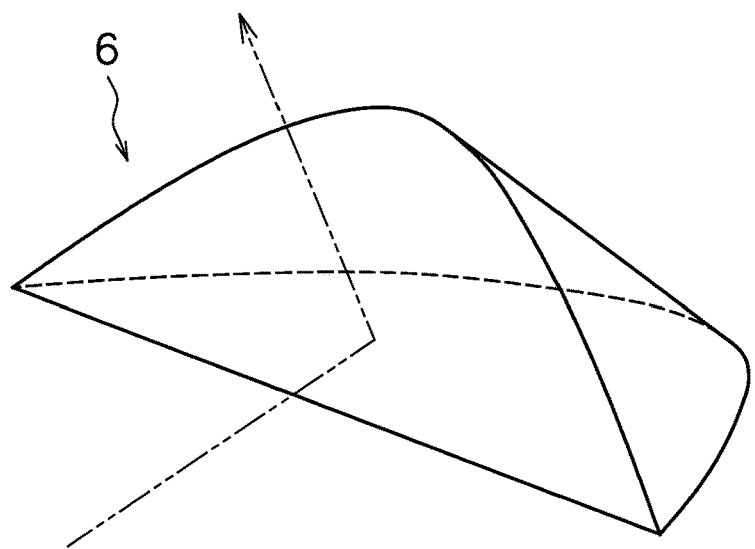
FIG. 5 is a perspective view of a prism.
Figure 6:
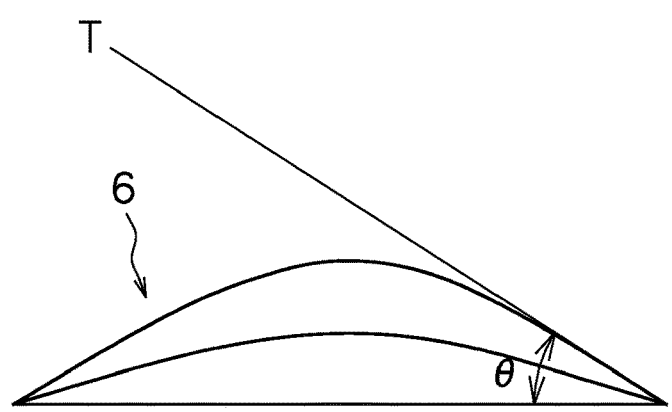
FIG. 6 is a view of the prism viewed from an emission surface side.

The light emitting portion 3 includes a plurality of light guide portions which are not illustrated. The plurality of light guide portions are provided to correspond to a plurality of fixed points included in the image A. Each light guide portion includes a plurality of prisms 6 disposed on the back surface 3b of the light emitting portion 3. FIG. 5 is a perspective view of the prism 6. FIG. 6 is a view of the prism 6 as viewed from the emission surface 3a side of the light emitting portion 3. In the present embodiment, the prism 6 has a spindle shape when viewed from the emission surface 3a side, and is formed in a shape having a flat reflection surface. As illustrated in FIG. 6, when the prism 6 is viewed from the emission surface 3a side, an angle θ formed by a tangent line T is preferably 80 degrees or less, more preferably 30 degrees or less. This makes it easier to pull out a mold when molding the prism 6. Further, the prism 6 may have a trapezoidal shape as illustrated in FIG. 7A, or may have a shape in which a side surface of a triangular prism is tapered as illustrated in FIG. 7B.

The plurality of prisms 6 are arranged in a way that light from the light source 1 is reflected toward the emission surface 3a of the light emitting portion 3 and converges at a fixed point corresponding to each light guide portion. As a result, a wavefront of light is formed in a way that light is emitted from a plurality of fixed points, and the image A is formed in a space by a collection of light converged at the plurality of fixed points.

As illustrated in FIG. 2, the light introduction portion 4 is bent and connected to the light emitting portion 3. In the present embodiment, the light introduction portion 4 is integrally formed with the light emitting portion 3. Further, the light introduction portion 4 and the light emitting portion 3 are connected in an L shape. The light emitting portion 3 and the light introduction portion 4 are integrally molded by injection molding, for example. In this case, as illustrated in FIGS. 8 and 9, the internal angle α formed by the light emitting portion 3 and the light introduction portion 4 is preferably set to be larger than 90 degrees. For example, in FIG. 8, the light introduction portion 4 is tilted more than 90 degrees with respect to the light emitting portion 3. Further, in FIG. 9, the internal angle α is set to be larger than 90 degrees by making an upper surface of the light introduction portion 4 a tapered surface. By setting the internal angle α formed by the light emitting portion 3 and the light introduction portion 4 to be larger than 90 degrees in the aforementioned way, a molded product can be smoothly taken out from the mold, thus the injection molding becomes easy.

As illustrated in FIG. 2, the light introduction portion 4 includes an incident portion 4a and a reflecting portion 4b. Light from the light source 1 is made incident on the incident portion 4a. As illustrated in FIG. 1, the incident portion 4a extends in an arc shape. The incident portion 4a may be provided with a prism for expanding a light guide angle of light incident from the light source 1. Alternatively, the incident portion 4a may have a lenticular shape (for example, a shape in which a plurality of curved-surface shapes are connected). The reflecting portion 4b is disposed to face the incident portion 4a. The reflecting portion 4b is formed to curve in an R-shape, reflects light from the light source 1 incident from the incident portion 4a and causes light from the light source 1 to be incident on the light emitting portion 3.

Figure 10:
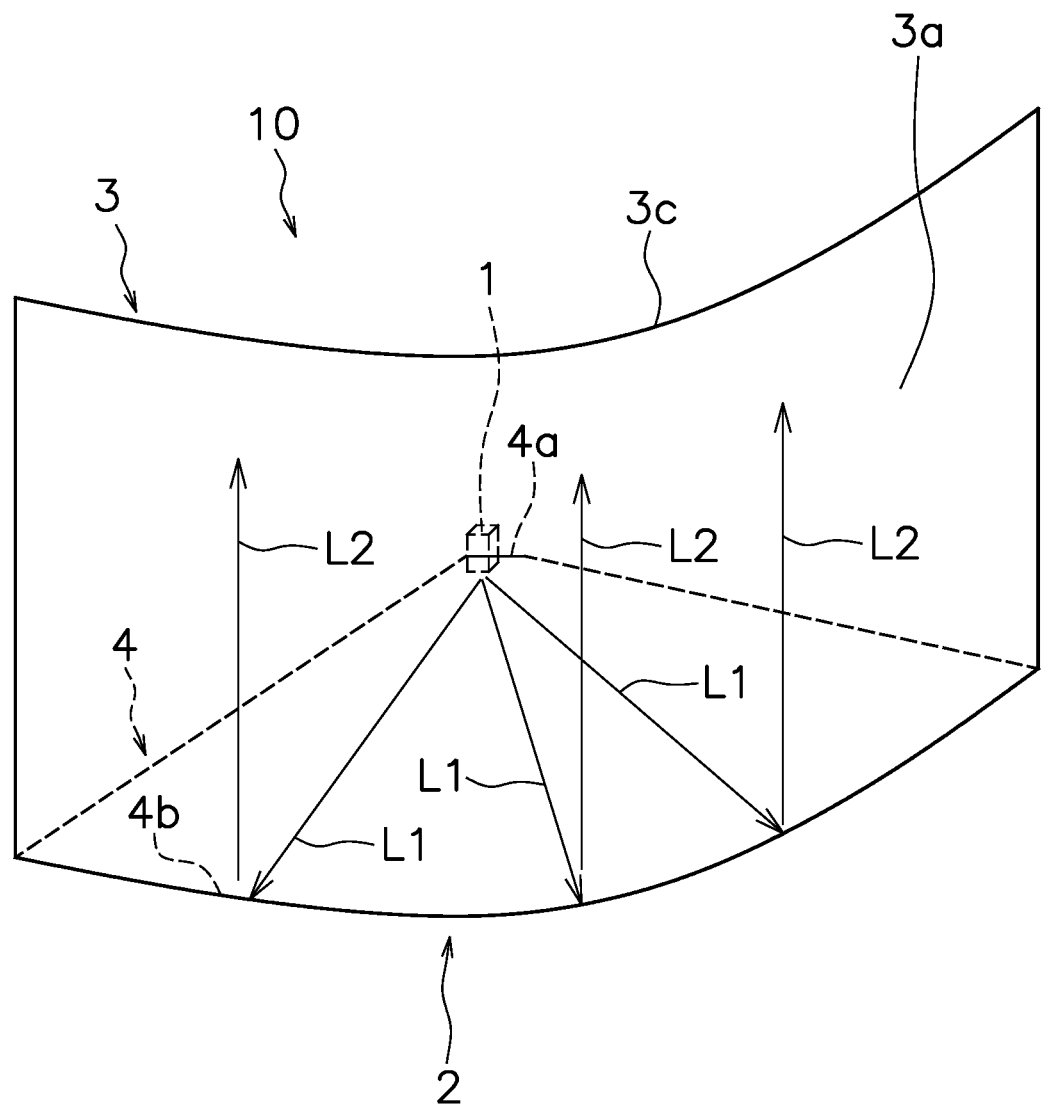
FIG. 10 is a view schematically showing a traveling direction of light incident on the light introduction portion.

Here, when the light emitting portion 3 is formed to curve, an incident angle from the light introduction portion 4 to the light emitting portion 3 can be made closer to 90 degrees as compared with a flat light guide plate. Specifically, as schematically illustrated in FIG. 10, when the light emitting portion 3 is curved, light L1 incident on the light introduction portion 4 from the light source 1 is incident on the reflecting portion 4b substantially straight. Therefore, light L2 incident on the light emitting portion 3 from the reflecting portion 4b is incident on the light emitting portion 3 as nearly parallel light which is parallel to the light emitting portion 3. In other words, by curving the light emitting portion 3, it is possible to prevent the incident angle from the light introduction portion 4 to the light emitting portion 3 from becoming small. As a result, since the light guide plate 2 can be easily designed, it is possible to suppress with a simple configuration the deviation of the image formation position of the image A and the blurring of the image A due to the difficulty of forming the image A.

Further, since the light introduction portion 4 is bent and connected to the light emitting portion 3, it is possible to suppress the occurrence of a dead space in the light emitting portion 3. Specifically, in order to reduce the spread of the incident light on the light guide portion of the light emitting portion 3, it is necessary to secure a certain distance from the light source 1 to the light guide portion of the light emitting portion 3. Therefore, when the light source 1 is disposed on an end surface of the light emitting portion 3, for example, a dead space in the light emitting portion 3 when viewed from the rear of the vehicle C becomes large. However, since the distance from the light source 1 to the light guide portion of the light emitting portion 3 can be secured by the light introduction portion 4 in the display device 10 according to the present embodiment, the dead space in the light emitting portion 3 can be reduced when viewed from the rear of the vehicle C as compared with the case where the light source 1 is disposed on the end surface of the light emitting portion 3.

Although one embodiment of the present invention has been described above, the present invention is not limited to the above embodiment, and various modifications can be made without departing from the gist of the invention.

For example, image forming means of the image A in the display device 10 may be realized by other known image forming means. Alternatively, it may be realized by a binocular system or a multiple-lens system. Further, the display device 10 may be applied not only to the vehicle C but also to other devices such as game machines.

Further, the display device 10 may be provided with a second light source for displaying a two-dimensional image so that the two-dimensional image and the three-dimensional image can be displayed in combination on the light emitting portion 3. In this case, since it becomes possible to display a two-dimensional image and a three-dimensional image by one light guide plate 2, the design of the image displayed by the display device 10 can be improved.

Figure 11:
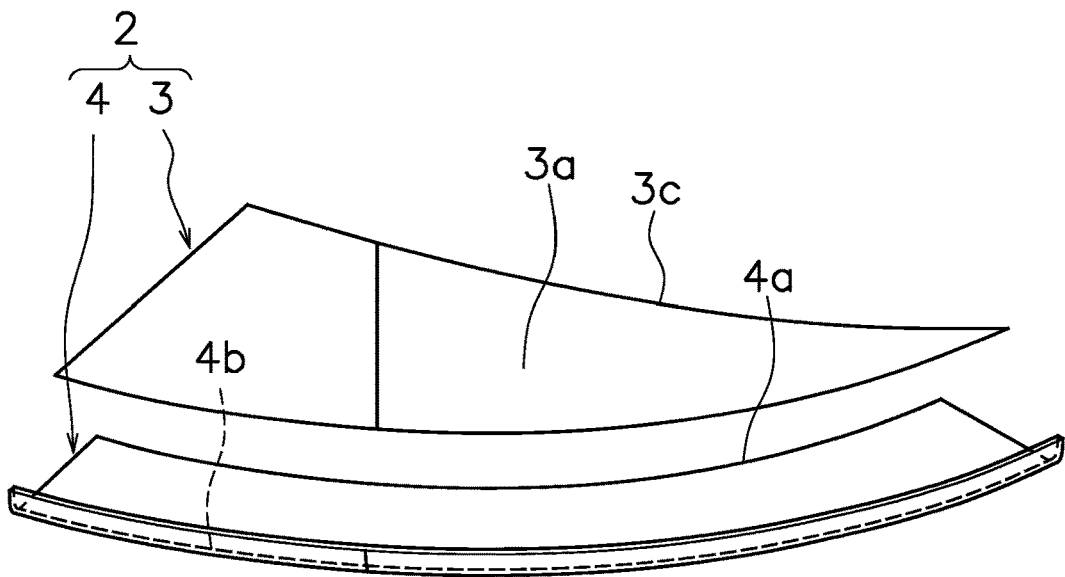
FIG. 11 is a view showing that the light guide plate and the light introduction portion are separately configured.
Figures 12A, 12B:
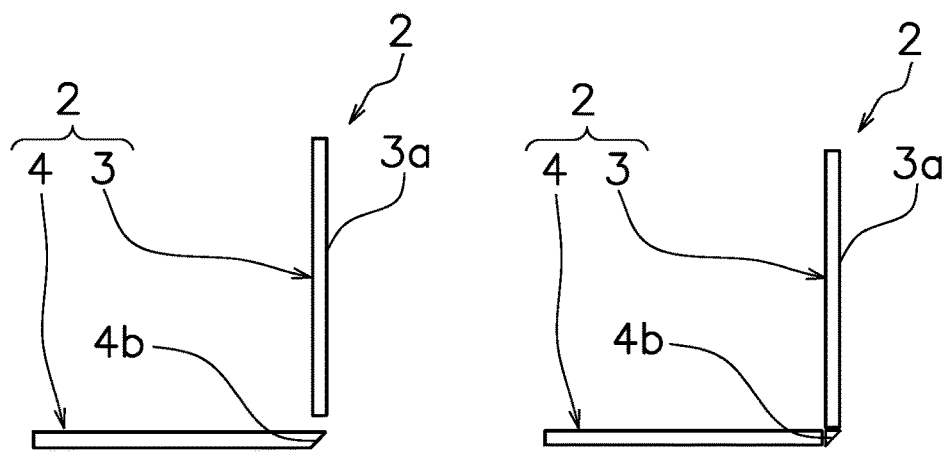
FIGS. 12A and 12B are cross-sectional views schematically showing a modified example of a connection part between the light guide plate and the light introduction portion.

In the above embodiment, the light introduction portion 4 is formed integrally with the light emitting portion 3, but the light introduction portion 4 may be formed separately from the light emitting portion 3 as illustrated in FIG. 11. In this case, the reflecting portion 4b may have a flat shape (integral or separate) as illustrated in FIGS. 12A and 12B. Further, vapor deposition treatment may be performed on the reflecting portion 4b to increase its reflection efficiency.

Further, in the case where the light introduction portion 4 is formed separately from the light emitting portion 3, a light incident portion 8 of the light emitting portion 3 on which light from the light source 1 is incident from the light introduction portion 4 may have a shape thicker than that of the light introduction portion 4 at a connecting part between the light emitting portion 3 and the light introduction portion 4 as illustrated in FIG. 13A. Further, as illustrated in FIG. 13B, the light incident portion 8 of the light emitting portion 3 may have a tapered shape that expands toward the light introduction portion 4. Further, as illustrated in FIG. 13C, the light incident portion 8 of the light emitting portion 3 may have a shape such that it covers a connecting part to the light introduction portion 4. In any of the shapes, light from the light source 1 can be efficiently transmitted from the light introduction portion 4 to the light emitting portion 3, and even if the positions of the light emitting portion 3 and the light introduction portion 4 are misaligned, decrease in the amount of light can be prevented.

Figure 14A:
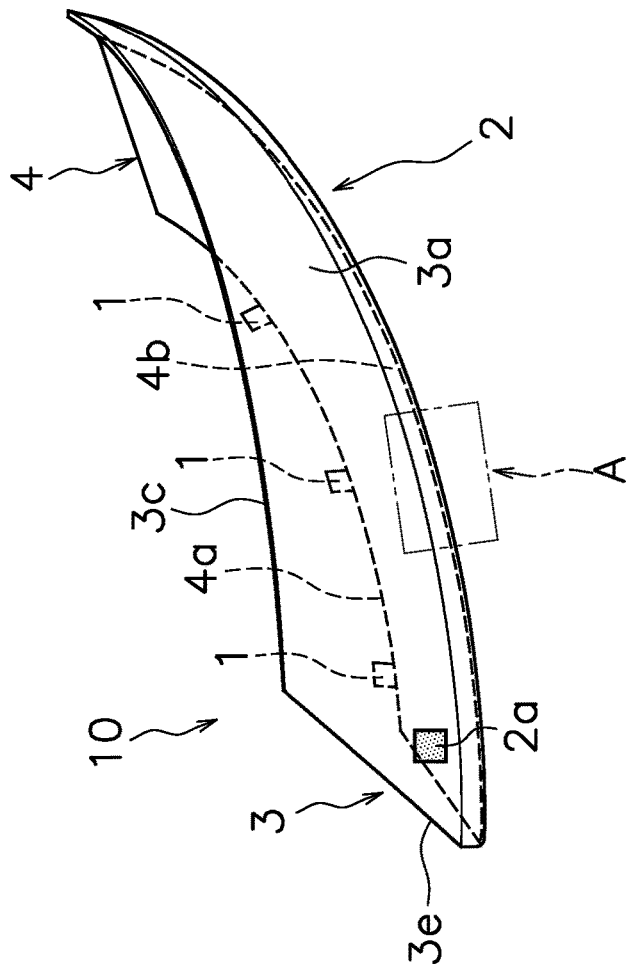
FIGS. 14A, 14B, 14C, 14D, and 14E are views showing an example of a test pattern portion.
Figure 14E:
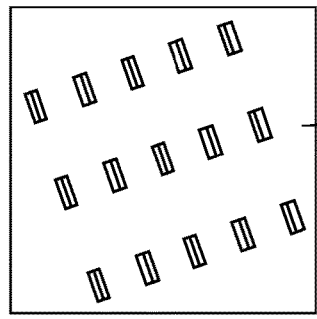
Figure 14D:
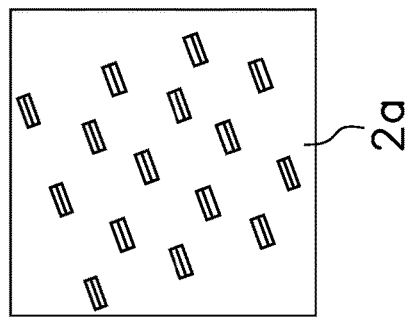
Figure 14C:
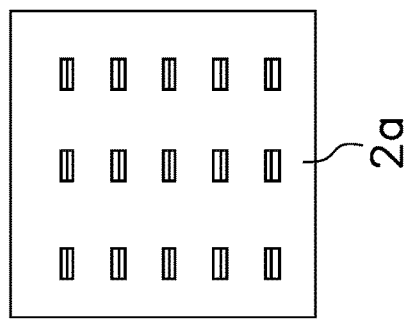
Figure 14B:
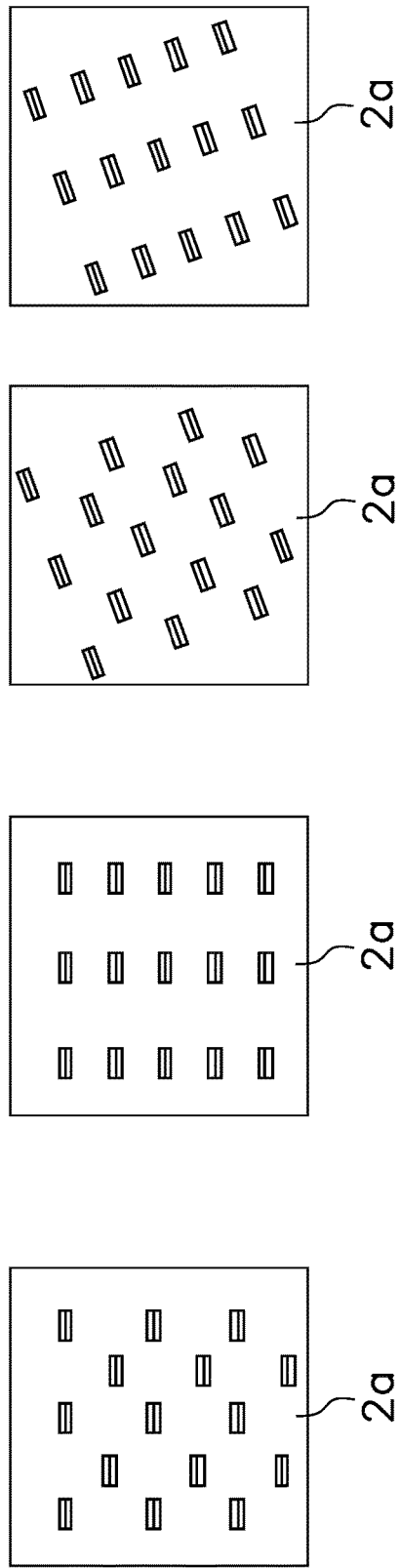

Further, as illustrated in FIG. 14A, the light guide plate 2 may further include a test pattern portion 2a. The test pattern portion 2a is disposed on a part of the emission surface 3a of the light emitting portion 3. The test pattern portion 2a is provided so that evaluation of emission characteristics of the light emitting portion 3 can be easily performed. The test pattern portion 2a is provided with a regular pattern in a staggered arrangement, a grid arrangement, or an arrangement in which a pattern is inclined with respect to the light guide direction as illustrated in FIGS. 14B to 14E. It is possible to easily evaluate the emission characteristics of the light emitting portion 3 by using the test pattern portion 2a. The test pattern portion 2a is preferably disposed at a position invisible from outside of the vehicle C.

Figure 15A:
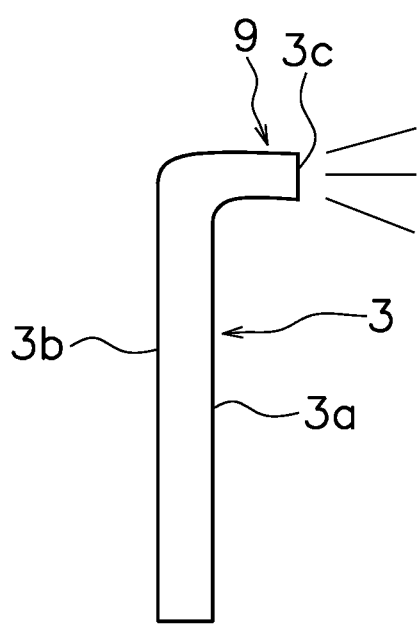
FIGS. 15A and 15B are cross-sectional views of a radiation portion of the light guide plate.
Figure 15B:
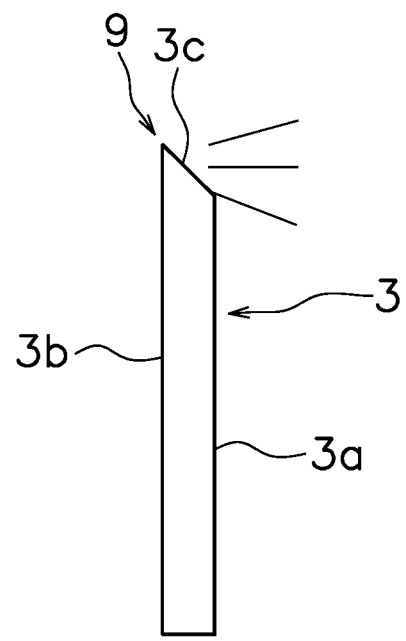

Further, as illustrated in FIG. 15A, the light emitting portion 3 may further include a radiation portion 9. The radiation portion 9 can radiate light which is incident from the light introduction portion 4 to outside of the light guide plate 2. As illustrated in FIG. 15A, the radiation portion 9 is formed by, for example, bending the end surface 3c of the light emitting portion 3. Alternatively, as illustrated in FIG. 15B, the radiation portion 9 is formed by tapering the end surface 3c of the light emitting portion 3. In this case, since the amount of light around the light emitting portion 3 can be increased, when the display device 10 is used for a tail lamp, for example, the visibility of the tail lamp can be improved.

REFERENCE NUMERALS

1 Light source
2 Light guide plate
2a Test pattern portion
3 Light emitting portion
3a Emission surface
4 Light introduction portion
9 Radiation portion
10 Display device
A Image

The invention claimed is:

1. A light guide plate configured to guide light from a light source to form a three-dimensional image in space, the light guide plate comprising:
　a light introduction portion into which light from the light source is introduced, the light introduction portion including a first portion and a second portion bent from the first portion; and
　a light emitting portion extending in a first direction crossing the light introduction portion and being positioned to receive from the light introduction portion reflected light from the light source, the light emitting portion connected to the second portion of the light introduction portion and being configured to emit from an emission surface thereof the light from the light source that has been received from the light introduction portion toward a region in space in front of the emission surface, the light emitting portion being curved in an arc when viewed from the first direction and the light emitting portion being configured to cause the light emitted therefrom to converge at a plurality of fixed points in said region in space in front of the emission surface, whereby the three-dimensional image is formed in the region of space in front of the emission surface from converged light,
　wherein the light introduction portion has a curved shape in an arc along the light emitting portion when viewed from the first direction, the light introduction portion including an incident portion that receives the light from the light source and a reflecting portion that reflects the light from the light source incident from the incident portion, and
　the light emitting portion has optical structure that receives and directs some of the light reflected by the reflecting portion toward positions along the emission surface, such that the emission surface emits the light as a focused three-dimensional image within the space.

2. The light guide plate to claim 1, wherein
　the light introduction portion is integrally formed with the light emitting portion.

3. The light guide plate according to claim 1, wherein the light introduction portion is formed separately from the light emitting portion.

4. The light guide plate according to claim 1, wherein the light introduction portion and the light emitting portion are connected in an L shape.

5. The light guide plate according to claim 1, wherein the light emitting portion includes a radiation portion formed on an end surface thereof, the radiation portion configured to radiate the light from the light source that has been received from the light introduction portion to outside of the light guide plate.

6. The light guide plate according to claim 1, further comprising:
a test pattern portion configured to evaluate emission characteristics of the light emitting portion, wherein the test pattern portion is provided on a part of the emission surface of the light emitting portion.

7. The light guide plate according to claim 1, wherein the light emitting portion has a back surface opposite the emitting surface, the light emitting portion having a curved shape that is concave from the back surface toward the emitting surface.

8. The light guide plate according to claim 1, wherein the light emitting portion is continuously curved when viewed from the first direction.

9. A display device, comprising:
the light guide plate according to claim 1, and
a light source disposed to introduce light into the incident portion of the light introduction portion.

10. The display device according to claim 9, wherein the light emitting portion has a back surface opposite the emitting surface, the light emitting portion having a curved shape that is concave from the back surface toward the emitting surface.

11. The display device according to claim 9, wherein the light emitting portion is continuously curved when viewed from the first direction.

12. The display device according to claim 9, wherein the reflecting portion has a curved shape in an arc along the light emitting portion when viewed from the first direction.

13. A curved light guide device that is configured to produce a three-dimensional image, comprising:
an image-forming light-emitting portion; and
a light-introduction portion by which light is introduced into the light-emitting portion;
wherein the light-emitting portion is formed as a plate-shaped light guide that is curved out-of-plane in a thickness direction thereof, the light-emitting portion including a plurality of optical elements that are disposed to cause light that is travelling within the light-emitting portion to be reflected out of the light-emitting portion and to converge at a plurality of points in a region of space in front of the light-emitting portion, whereby the three-dimensional image is formed in said region of space in front of the light-emitting portion from converged light;
the light-introduction portion is formed as a plate-shaped light guide that is oriented transversely relative to the light-emitting portion, the light-introduction portion having a light incidence surface by which light is introduced into the light-introduction portion and a reflection portion that is located across the light-introduction portion from the light incidence surface, the reflection portion being configured to reflect light travelling within the light-introduction portion out-of-plane relative to the light-introduction portion; and
the light-introduction portion is positioned relative to the light-emitting portion, with the reflection portion of the light-introduction portion curving to match the out-of-plane curvature of the light-emitting portion, so that light introduced into the light-introduction portion via the light incidence surface is reflected out of the light-introduction portion and into the light-emitting portion, then out of the light-emitting portion to form the three-dimensional image in the region of space in front of the light-emitting portion.

14. The device according to claim 13, wherein the light-emitting portion includes a front, emission surface and a rear surface opposite thereto, with the optical elements comprising prisms disposed along the rear surface of the light-emitting portion that are configured and arranged to cause the light travelling within the light-emitting portion to exit the light-emitting portion via the front, emission surface thereof and to cause the emitted light to converge at said plurality of points in said region of space in front of the light-emitting portion.

15. The device according to claim 13, wherein the light-introduction portion is arranged relative to the light-emitting portion such that a cross-section of the device is L-shaped.

16. The device according to claim 14, wherein the light-emission portion is curved with the front, emission surface being convex and the rear surface being concave.

* * * * *